United States Patent [19]
Gysel et al.

[11] Patent Number: 5,293,547
[45] Date of Patent: Mar. 8, 1994

[54] METHOD AND APPARATUS TO COMPENSATE FOR DISTORTION IN OPTICAL TRANSMISSION SYSTEMS

[75] Inventors: Hermann Gysel; Mani Ramachandran, both of San Jose, Calif.

[73] Assignee: Synchronous Communications, Inc., San Jose, Calif.

[21] Appl. No.: 25,601

[22] Filed: Mar. 3, 1993

Related U.S. Application Data

[62] Division of Ser. No. 787,830, Nov. 5, 1991, Pat. No. 5,243,613.

[51] Int. Cl.$^5$ .............................................. G02F 1/00
[52] U.S. Cl. ...................................... 359/337; 359/341
[58] Field of Search ........................ 359/337, 338, 341

[56] References Cited

U.S. PATENT DOCUMENTS

| | | | |
|---|---|---|---|
| 3,774,120 | 11/1973 | Ross | 355/377 |
| 4,979,234 | 12/1990 | Agrawal et al. | 359/377 |
| 5,218,665 | 6/1993 | Grasso et al. | 359/341 X |

*Primary Examiner*—Mark Hellner
*Attorney, Agent, or Firm*—Fliesler, Dubb, Meyer & Lovejoy

[57] ABSTRACT

An electrical compensation circuit and an optical compensation circuit are provided for compensating for expansion-type and compression-type gain distortion due to the interaction of a laser and an optical amplifier. In the electrical compensation circuit there is provided a linear signal path and a nonlinear signal path. A delay circuit in the linear signal path compensates for a signal delay in the nonlinear signal path. In the nonlinear signal path there is provided an FET and a transformer. A modulation signal applied to the linear signal path and the nonlinear signal path is processed in the nonlinear signal path and combined with the signal in the linear signal path so as to provide a predistorted modulation signal which is substantially equal in amplitude and opposite in phase to the gain distortion in the optical signal at the output of the optical amplifier. In the optical compensation circuit there is provided a predetermined length of erbium-doped fiber which is inserted between a laser and an erbium-doped fiber amplifier (EDFA) so as to provide an absorption of the output of the laser which is equal in magnitude and opposite in phase to the gain distortion in the output signal of an uncompensated EDFA.

3 Claims, 9 Drawing Sheets

METHOD AND APPARATUS TO COMPENSATE FOR DISTORTION IN OPTICAL TRANSMISSION SYSTEMS

This application is a divisional of Ser. No. 07/787,830, filed Nov. 5, 1991, now U.S. Pat. No. 5,243,613.

BACKGROUND OF THE INVENTION

1. Field of the Invention

The present invention relates to a method and apparatus to compensate for distortion products in optical transmission systems in general and in particular to a method and apparatus to compensate for distortion products in an optical signal resulting from the interaction of a laser and an optical amplifier.

2. Description of the Prior Art

Various techniques have been used to compensate for non-linear characteristics of optical sources, i.e. lasers and modulators, in an optical signal transmission system. One such technique is called predistortion linearization. Predistortion linearization comprises the use of a non-linear device which provides an output signal which is equal in amplitude but opposite in phase with the distortion products produced in the optical sources. For example, the use of predistortion linearization of a directly modulated distributed feedback (DFB) laser and a Mach-Zehnder external modulator in an AM video transmission system was reported in a paper presented by Richard B. Childs and Vincent A. O'Byrne in the OPTICAL FIBER COMMUNICATION CONFERENCE, 1990 Technical Digest Series, Vol. 1, Conference Edition, January 1990. For the DFB laser the required predistortion circuit produced only composite second-order distortion (CSO). This was implemented using the square law transfer function of a field effect transistor (FET). The Mach-Zehnder modulator required a predistortion circuit which generated composite triple beat (CTB), i.e. third-order, distortion products with negligible second-order distortion. This was implemented using a balanced arrangement of Schottky diodes with exponential transfer functions.

The above described predistortion linearization circuits and techniques reported by Childs et al were used to compensate for distortion products in DFB lasers and modulators in an AM optical transmission system. However, so far as is known, such techniques have not been used to compensate for gain distortion products in an optical signal in the output of an optical amplifier which are produced as a result of the interaction of a laser and the optical amplifier coupled thereto. Also, the prior known compensation circuits have been generally limited to providing expansion-type gain compensation.

Expansion-type gain compensation is a compensation which compensates for a reduction in gain of the optical amplifier as a function of wavelength by increasing, i.e. expanding, the amplitude of the output signal of the laser. It has been found, however, that distortion products resulting from the interaction of a laser and an optical amplifier coupled thereto may comprise, depending on the wavelength of the laser, either expansion-type or compression-type gain distortion and thereby require either compression-type or expansion-type gain compensation, respectively. Heretofore, there has been no apparatus or method proposed which provides both types of compensation automatically and/or inexpensively.

SUMMARY OF THE INVENTION

In view of the foregoing, principal objects of the present invention are a method and apparatus for providing either expansion-type or compression-type gain compensation to compensate for the gain distortion products resulting from the interaction of a laser and an optical amplifier optically coupled thereto.

In accordance with the above objects there is provided both an electrical compensation circuit and an optical compensation circuit. The electrical compensation circuit is typically coupled between a modulation signal source and the modulation signal input of the laser. The optical compensation circuit is typically coupled between the laser and the optical amplifier. Either of the circuits may be used in a given optical signal transmission system.

The electrical compensation circuit comprises a direct/linear signal path and a predistortion/nonlinear signal path. In the linear signal path there is provided a delay circuit for compensating for signal delay in the nonlinear signal path. In the nonlinear signal path there is provided a field effect transistor (FET) and a transformer having a primary and a secondary winding, each primary and secondary winding having two terminals. The primary winding is coupled to the FET and the gate of the FET is coupled to the linear signal path by a power splitter. The secondary winding is coupled to the linear signal path by a power combiner. The power splitter and combiner are located on opposite sides of the delay circuit in the direct signal path.

In operation, a modulation signal is split between the linear signal path and the nonlinear signal path. In the nonlinear signal path the modulation signal is distorted by the second order transfer function of the FET and applied to the primary winding of the transformer. Of the two terminals of the secondary winding of the transformer, the one which is coupled to the linear signal path by means of the power combiner depends on the wavelength of the laser and is chosen such that the distorted modulation signal from the secondary winding which is combined with the modulation signal in the linear signal path is equal in amplitude and opposite in phase with the gain distortion products in the optical signal which results from the interaction of the laser and the optical amplifier. For example, if the wavelength of the laser is such that, in the absence of compensation, an expansion-type gain distortion is produced at the output of the optical amplifier, i.e. a gain distortion wherein the gain increases with wavelength, a first one of the terminals of the secondary winding is connected to the linear signal path so as to add to the modulation signal in the linear path a compression-type predistortion. On the other hand, if an expansion-type predistortion is required, the second one of the two terminals of the secondary winding is coupled to the linear signal path. The modified or predistorted modulation signal is then provided at the output of the power combiner for use by a laser coupled thereto.

To facilitate the switching of the terminals of the secondary winding in the field, there is provided in another embodiment of the present invention a switching circuit for selectively providing either an expansion-type or a compression-type predistortion.

Optical amplifiers with which the optical compensation circuit of the present invention is used comprise an erbium doped fiber amplifier (EDFA) which has a gain profile which varies as a function of the wavelength of the laser. Moreover, the slope of the gain profile changes as a function of the pump laser intensity.

The optical compensation circuit of the present invention comprises a predetermined quantity or length of the same erbium doped fiber used in the EDFA. The length of this fiber, which is called an absorption fiber to distinguish it from the amplifying fiber in the EDFA, is chosen to provide an absorption profile as a function of wavelength of the laser which is equal in magnitude and opposite in phase to the variation in the mean gain profile of the EDFA and is inserted between the laser and the EDFA.

The absorption fiber profile also tends to vary as a function of applied signal strength and pump intensity and wavelength in single pump amplifiers. Thus, depending on the magnitude of these variations it may be necessary to include a filter between the absorption fiber and the EDFA to block pump light from the absorption fiber.

In practice, the preferred or predetermined length of the absorption fiber in meters is made by first measuring the gain profile of the uncompensated laser and EDFA apparatus as a function of the wavelength of the laser and, thereafter, calculating the quotient of the mean variation of the EDFA gain in decibels (dB) and the coefficient of absorption of the erbium absorption fiber at a predetermined operating wavelength in dB. For example, if the mean gain variation, i.e. the variation of EDFA gain from a mean value, is 3 dB at a predetermined nominal operating wavelength and the coefficient of absorption of the erbium absorption fiber at that wavelength is 5 dB/meter, the preferred length of the absorption fiber is 0.6 meters.

An advantage of the optical compensation circuit of the present invention is that it automatically provides both expansion-type and compression-type gain compensation as required, whereas the electrical compensation circuit requires that the terminals of the secondary winding connected to the linear signal path be switched as a function of wavelength either during manufacture or by use of a switch.

BRIEF DESCRIPTION OF THE DRAWINGS

The above and other objects, features and advantages of the present invention will become apparent from the following detailed description of the accompanying drawings, in which:

FIGS. 10A, 10B1, 10B2, and 10B3 are schematic diagrams of an electrical expansion-type gain compensation circuit according to the present invention;

DETAILED DESCRIPTION OF THE INVENTION

Figure 1:
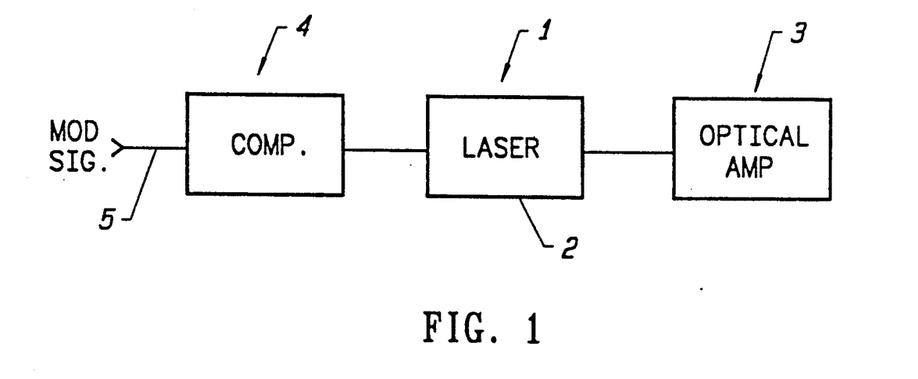
FIG. 1 is a simplified block diagram of an optical signal transmission system comprising an electrical compensation circuit coupled to the modulation signal input of a laser coupled to an optical amplifier.

Referring to FIG. 1, there is shown in a simplified block diagram an optical signal transmission system designated generally as 1. In the system 1 there is provided a laser 2. Coupled to the optical output of the laser 2 there is provided an optical amplifier 3. The amplifier 3 typically comprises an erbium-doped fiber amplifier. Coupled to the modulation signal input of the laser 2 there is provided an electrical compensation circuit 4 having an input signal line 5 for receiving a modulation signal from a modulator not shown.

Figure 2:
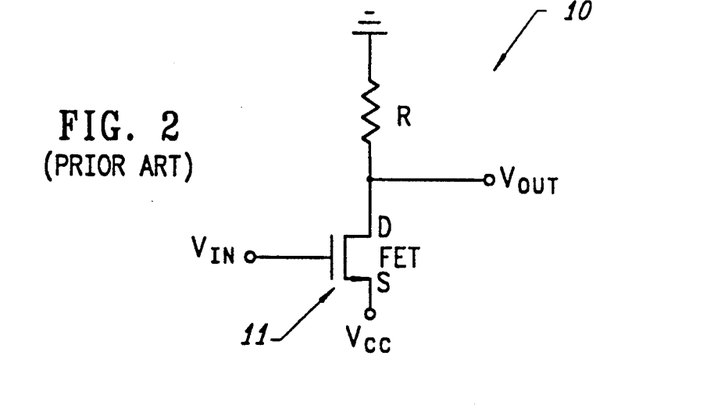
FIG. 2 is a simplified schematic showing the use of a field effect transistor (FET) which has been used heretofore for providing electrical compensation.

Referring to FIG. 2, there is shown a simplified schematic of a prior known electrical compensation circuit designated generally as 10. In the circuit 10 there is provided a field-effect transistor (FET) 11 having a source S coupled to a source of potential $V_{cc}$, a drain D coupled to ground through a resistor R and a gate coupled to a source of a modulation signal $V_{IN}$. The output of the circuit 10 which comprises a predistorted modulation signal is provided from a node between the drain 10 and the resistor R and is designated $V_{OUT}$.

Figure 3:
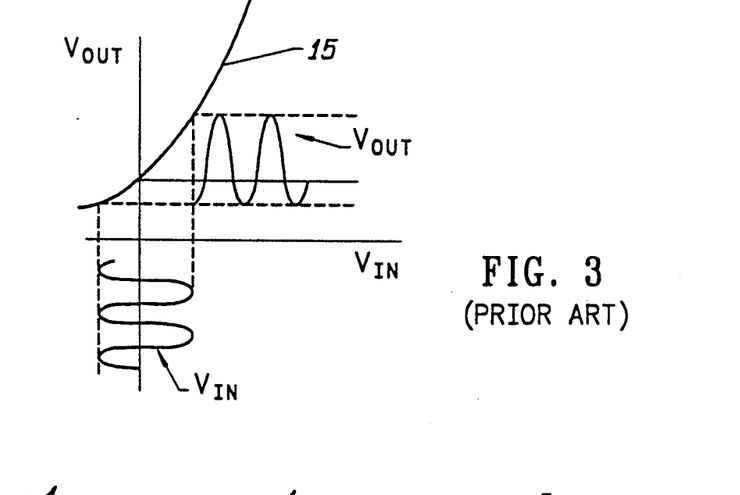
FIG. 3 is a drawing of output voltage as a function of modulation input voltage in the circuit of FIG. 2.

Referring to FIG. 3, the FET 11 of FIG. 2 comprises a nonlinear transfer function as represented by the curve 15. The nonlinear transfer function produces an increase or expansion of the positive portions of the input modulation signal. As described above, this characteristic has been used heretofore to compensate for compression-type gain distortions in optical signal sources, i.e. lasers and modulators.

Figure 4:
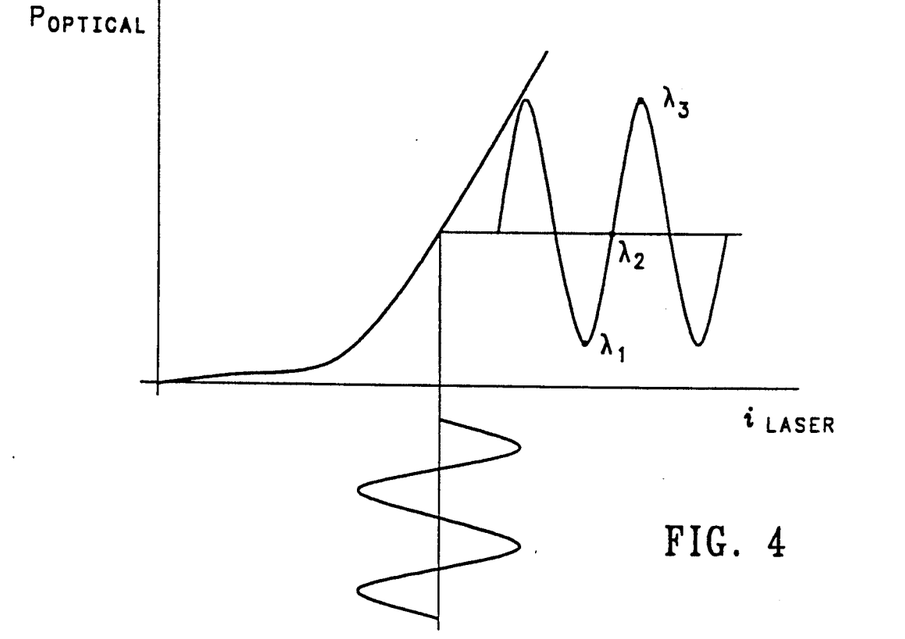
FIG. 4 is a diagram of optical output power as a function of laser current in a typical laser optical signal transmission system.

Referring to FIG. 4, it has been discovered that the interaction of a laser and an optical amplifier produces power/gain distortions in the optical signal at the output of the amplifier which are believed to result from the well-known phenomena called "chirp" wherein the wavelength $\lambda$ of the laser shifts as a function of changes in the laser current resulting from a modulation thereof, as shown in FIG. 4. For example, increasing changes in wavelength $\lambda$ are represented by the symbols $\lambda_1$, $\lambda_2$, and $\lambda_3$.

Figure 5:
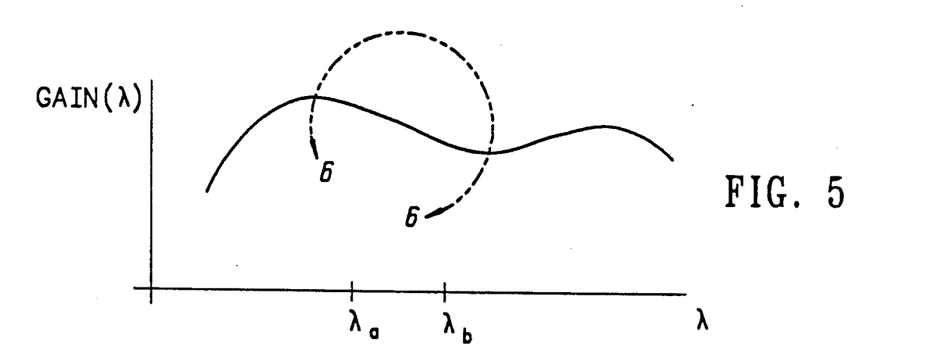
FIG. 5 is a diagram of the gain profile of an optical amplifier as a function of wavelength.
Figure 6:
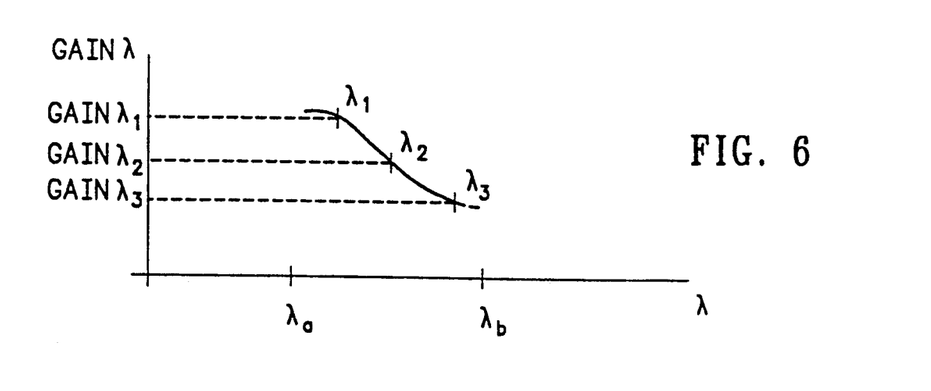
FIG. 6 is a drawing of an expanded portion of the gain profile shown within the lines 6—6 of FIG. 5.

Referring to FIGS. 5 and 6, the gain of the optical amplifier is affected by this shift in wavelength and, depending on the wavelength involved, the shift in gain may be either positive or negative. A negative shift in the gain or slope of the gain of an optical amplifier as a function of wavelength is illustrated in FIGS. 5 and 6 wherein $\lambda_1$, $\lambda_2$, $\lambda_3$ represent three successively increasing wavelengths between a range of wavelengths represented by $\lambda_a$, $\lambda_b$. If the wavelength of the laser is such as to result in a negative slope in the gain profile of an optical amplifier, the resulting optical signal is said to comprise a compression type gain distortion. On the other hand, if the gain of the amplifier increases as a function of wavelength, the resulting optical output signal is said to comprise expansion-type gain distortion.

Figure 7:
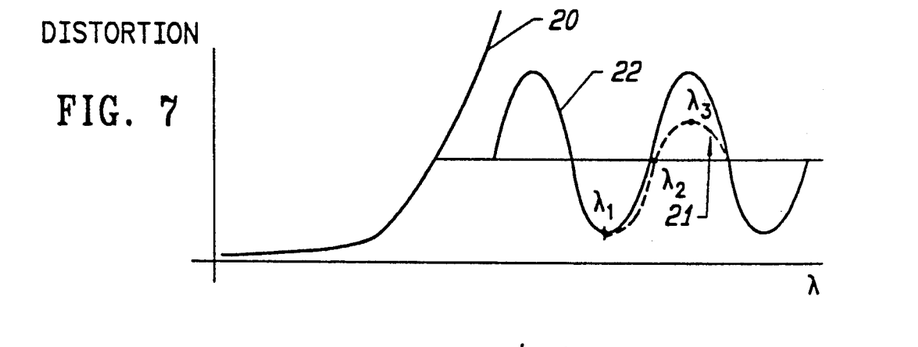
FIG. 7 is a diagram showing a representation of compression-type gain distortion resulting from the interaction of a laser and an optical amplifier as a function of wavelength when using an uncompensated laser modulation signal.

Referring to FIG. 7, there is shown a solid curve 20 representing an uncompensated transfer function and representation of compression-type gain distortion as a function of wavelength $\lambda$ wherein the magnitude of distortion increases with $\lambda$ as shown by the broken line curve 21 and wavelength indicators $\lambda_1$, $\lambda_2$, $\lambda_3$ versus a non-distorted optical signal represented by the solid line 22.

Figure 8:
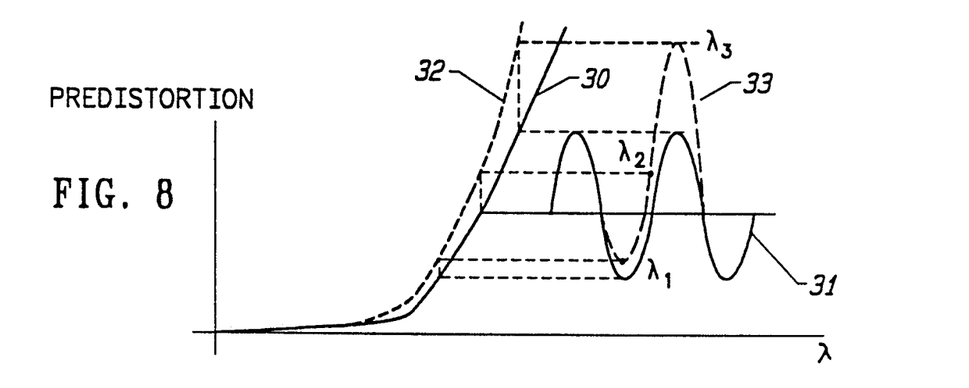
FIG. 8 is a diagram representing predistortion of a laser modulation signal as a function of wavelength to compensate for the type of distortion represented in FIG. 7.

Referring to FIG. 8, there is shown a pair of solid curves 30,31 and a pair of broken curves 32,33. The curve 30 represents the gain transfer function of a typical uncompensated optical signal transmission system while the broken curve 32 represents the transfer function of a compensated optical signal transmission system wherein the compensation comprises expansion-type gain compensation. The magnitude of the gain as shown by broken curve 33 relative to the uncompensated gain curve 31 is increased substantially as a function of increasing wavelength as shown at points $\lambda_1$, $\lambda_2$, $\lambda_3$.

Figure 9:
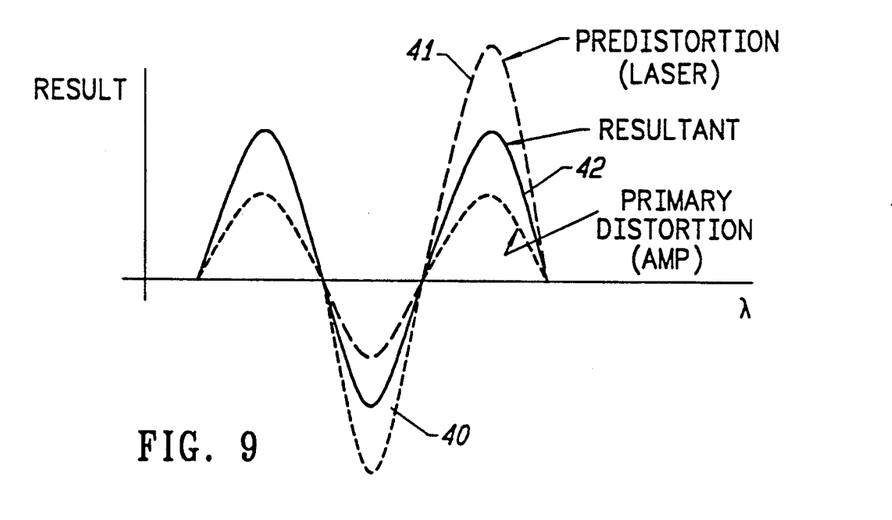
FIG. 9 is a diagram showing the resultant optical signal output in an optical transmission system using predistortion linearization techniques according to the present invention.

Referring to FIG. 9, there is shown a broken curve 40, a dashed curve 41 and a solid curve 42. The broken curve 40 represents the primary compression-type gain distortion due to the interaction of a laser and an optical amplifier as shown in FIG. 7. The dashed curve 41 represents an expansion-type compensation in accordance with the present invention as shown in FIG. 8. Curve 42 represents the results of the distortion compensation circuit according to the present invention wherein the gain of the amplifier is made linear with respect to the original baseband input signal.

Figure 10A:
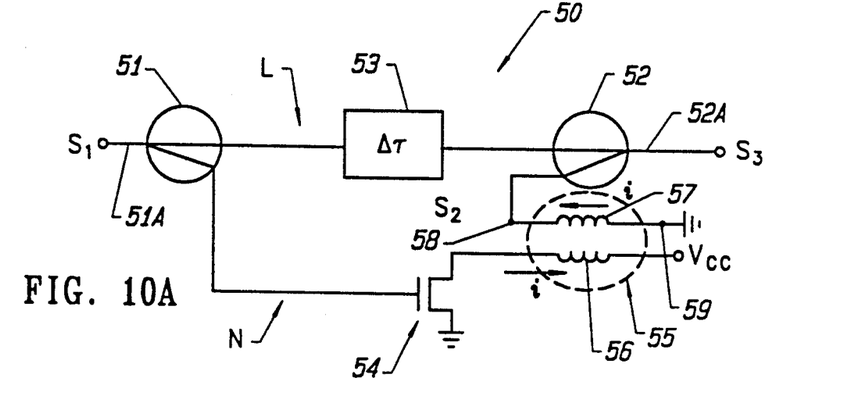
Figure 10B:
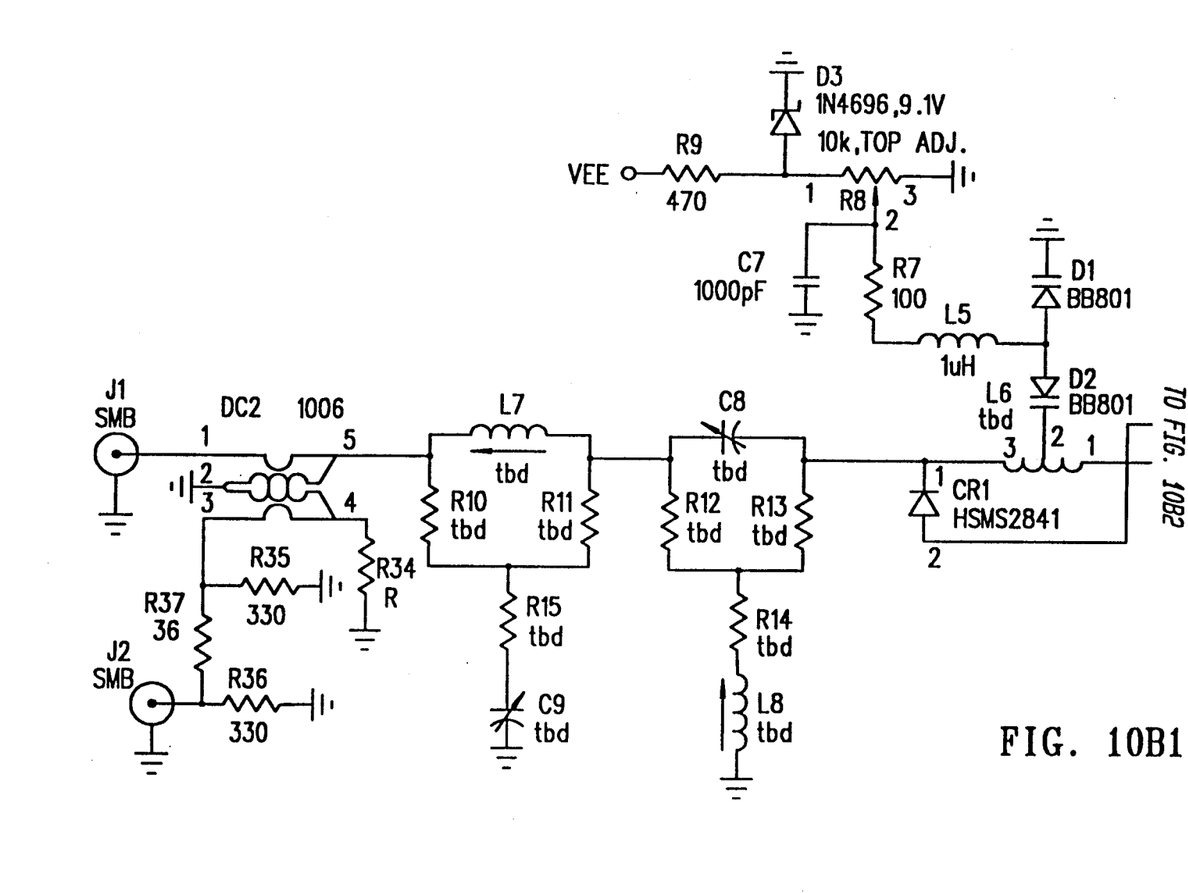
Figure 10B:
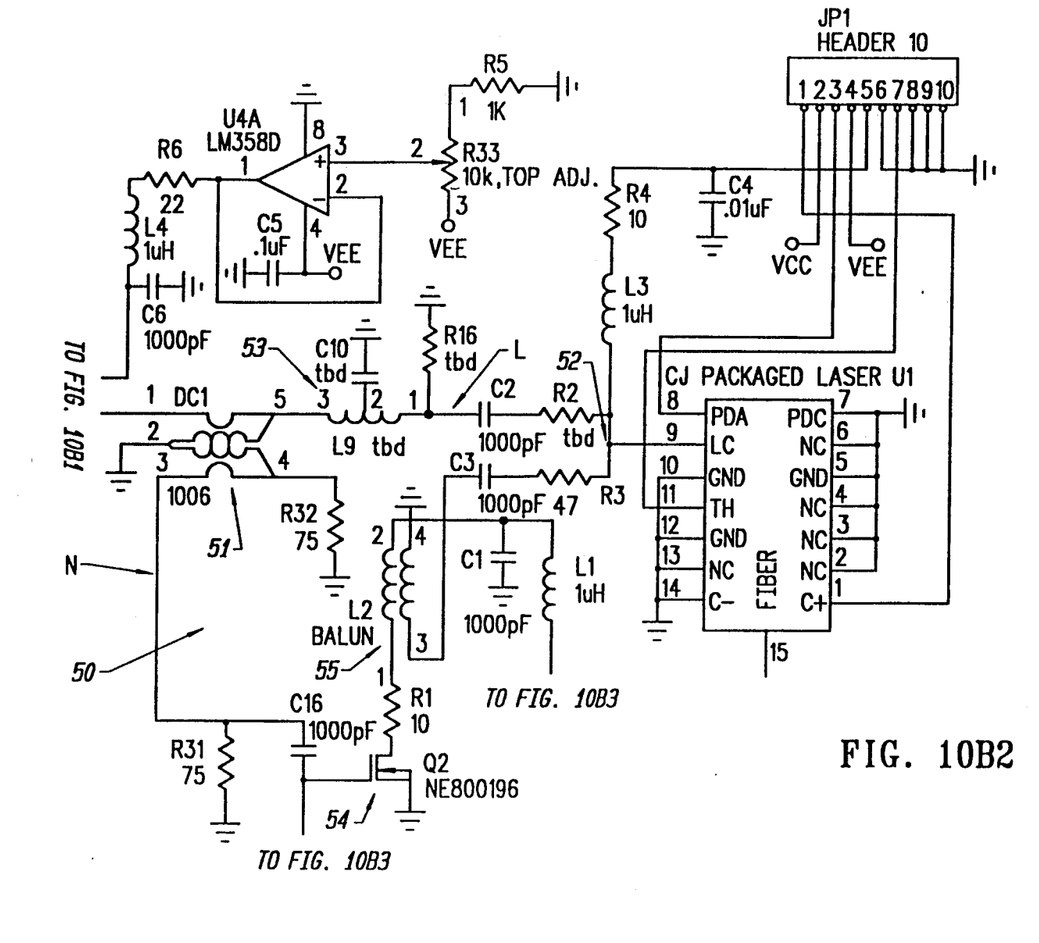
Figure 10B:
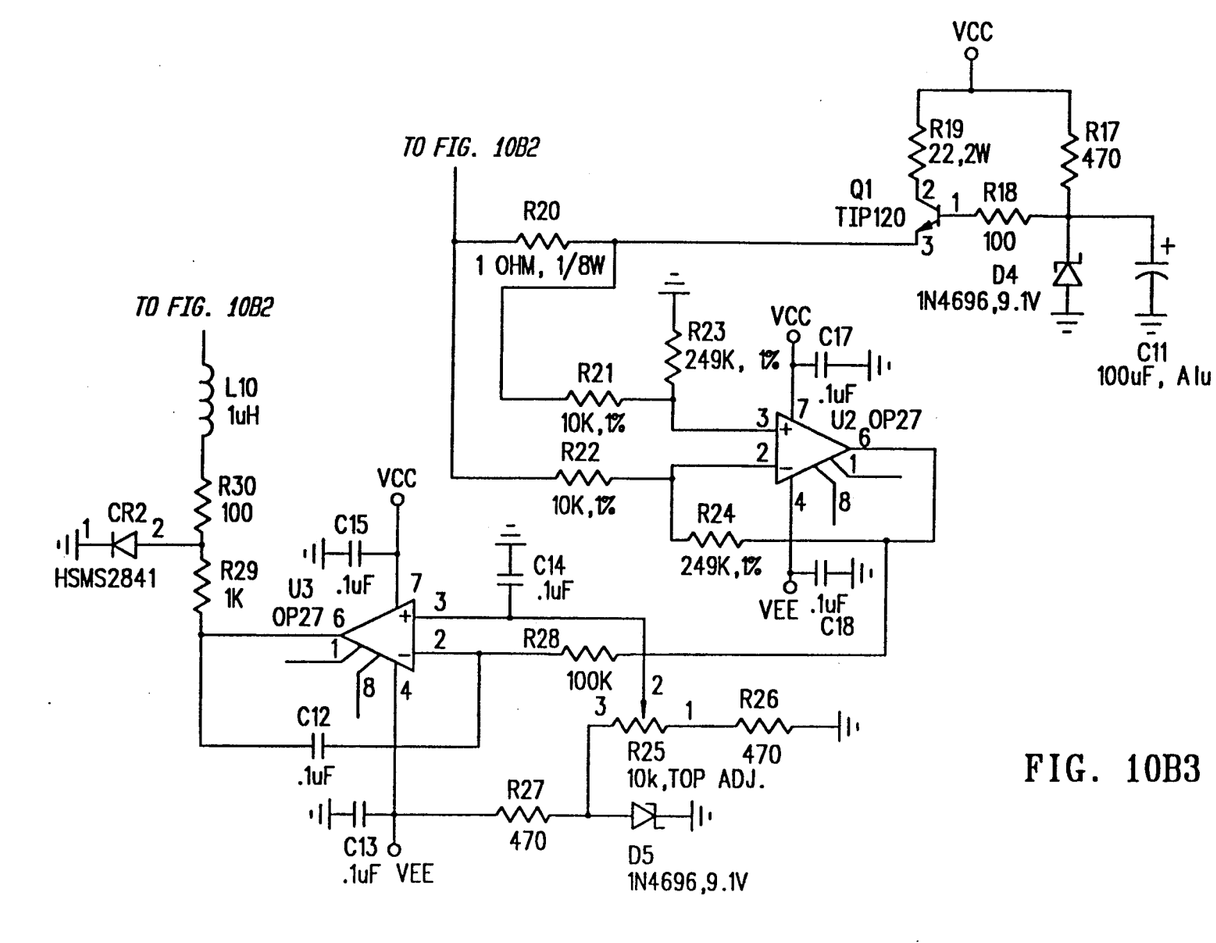

Referring to FIGS. 10A and 10B, there is provided in accordance with the present invention an electrical compensation circuit designated generally as 50. In the circuit 50 there is provided a direct/linear signal path designated generally as L, a predistorted/nonlinear signal path designated generally as N, a power splitter 51 and a power combiner 52. Coupled between a first output of the power splitter 51 and a first input of the power combiner 52 in the linear signal path L there is provided a delay circuit 53. Coupled between a second output of the power splitter 51 and a second input of the power combiner 52 in the nonlinear signal path N there is provided a field effect transistor 54 and a transformer 55. The gate of the transistor 54 is coupled to the second output of the power splitter 51. A first substrate electrode of the transistor 54 is coupled through the primary 56 of the transformer 55 to a source of potential $V_{cc}$. The second substrate electrode of the transistor 54 is coupled to ground. A first terminal 58 of the secondary winding 57 of the transformer 55 is coupled to the second input of the power combiner 52 and a second terminal 59 of the secondary winding 57 of the transformer 55 is coupled to ground. An input 51a to the power splitter 51 is provided for coupling the circuit 50 to a source of a modulation signal. An output 52a of the power splitter 52 is provided for coupling the circuit 50 to a modulation signal input terminal of a laser.

Figure 12:
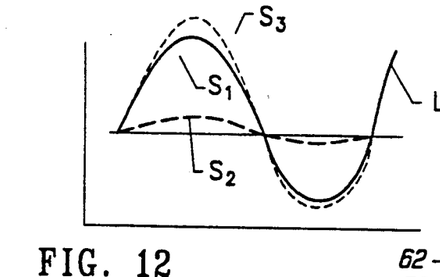
FIG. 12 is a diagram showing the principal signals in the expansion-type gain compensation circuit of FIG. 10.

In operation, a modulation signal $S_1$ is applied to the input terminal 51a of the power splitter 51 and split between the linear signal path L and the nonlinear signal path N. In the nonlinear signal path N the modulation signal is distorted in a nonlinear fashion by the field effect transistor 54 and fed to the primary of the transformer 55. A signal $S_2$ appearing at the terminal 58 of the secondary winding 57 of the transformer 55 is then combined with the modulation signal $S_1$ in the linear signal path L by the combiner 52. The delay circuit 53 compensates for signal delay in the nonlinear signal path N. Combining the signals $S_1$ and $S_2$ in the linear and nonlinear signal paths L and N produces a predistorted modulation signal $S_3$ at the output terminal 52a of the power combiner 52 as shown in FIG. 12.

With the terminal 58 of the secondary winding 57 of the transformer 55 coupled to the combiner 52, the compensation circuit 50 provides an expansion-type gain compensation to compensate for a compression-type gain distortion. To compensate for an expansion-type gain distortion, all that is required is to switch the terminals of the secondary winding 57 as shown in FIG. 11.

Figure 11:
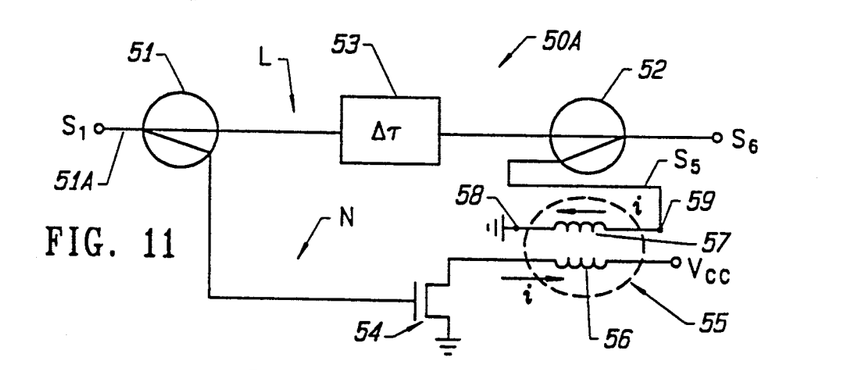
FIG. 11 is a schematic diagram of an electrical compression-type gain compensation circuit according to the present invention.
Figure 13:
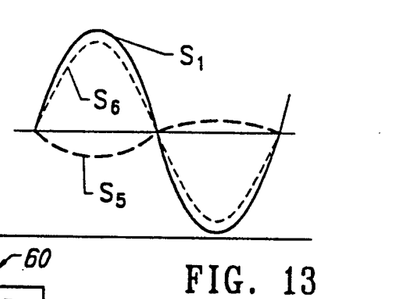
FIG. 13 is a diagram of the principal signals in the compression-type gain compensation circuit of FIG. 11.

Referring to FIG. 11, there is provided a compression-type gain compensation circuit 50a which is identical to circuit 50 of FIG. 10, but wherein the terminal 59 of the secondary winding 57 is coupled to the second input of the power splitter 52 and the terminal 58 of the secondary winding 57 is coupled to ground. In this embodiment a signal $S_5$ at the terminal 59 of the secondary winding 57, which is opposite in phase to the signal $S_2$ of FIG. 10, is combined with the input signal $S_1$. This combining produces a predistorted modulation signal $S_6$ at the output of combiner 52 which has a nonlinearly reduced amplitude relative to the undistorted modulation signals applied to the input terminal 51a of the power splitter 51 as shown in FIG. 13.

Figure 14:
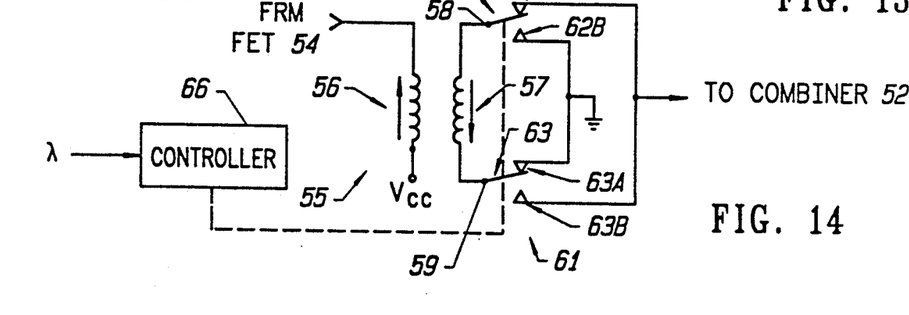
FIG. 14 is a schematic diagram of a switch for use in the embodiments of FIGS. 10 and 11 according to the present invention.

Referring to FIG. 14, there is provided for use in the embodiments of FIGS. 10 and 11 a switching circuit designated generally as 60 for selectively switching the terminals 58 and 59 of the secondary winding of the transformer 55 to the second input of the power combiner 52.

In the circuit 60 there is provided a double pole switch 61 comprising a pair of wipers 62,63, a pair of contacts 62a, 62b associated with the wiper 62 and a pair of contacts 62a,63b associated with the wiper 63. The position of the wipers 62,63 are controlled by a switch controller 66 in response to a signal input corresponding to the wavelength λ of the laser.

Depending on the wavelength λ, the wiper 62 will be switched between contacts 62a and 62b and the wiper 63 will be switched between contacts 63a and 63b in order to provide either expansion-type gain compensation or compression-type gain compensation as required. In its simplest form, the switch controller 66 may comprise a simple two-position switch actuator for controlling the position of the wipers 62,63.

In practice, using the two-position switch actuator, the operation of the optical signal transmission system is analyzed to determine whether either expansion-type gain compensation or compression-type gain compensation is required and the wipers 62,63 set accordingly.

In cases wherein the type of gain compensation required is fixed or predetermined and is not likely to change, the switch 60 and controller 66 of FIG. 14 can be eliminated altogether and the appropriate terminal of the secondary winding of the transformer 55 connected to the second input of the power combiner 52 as required in the course of manufacturing the compensation circuit.

Figure 15:
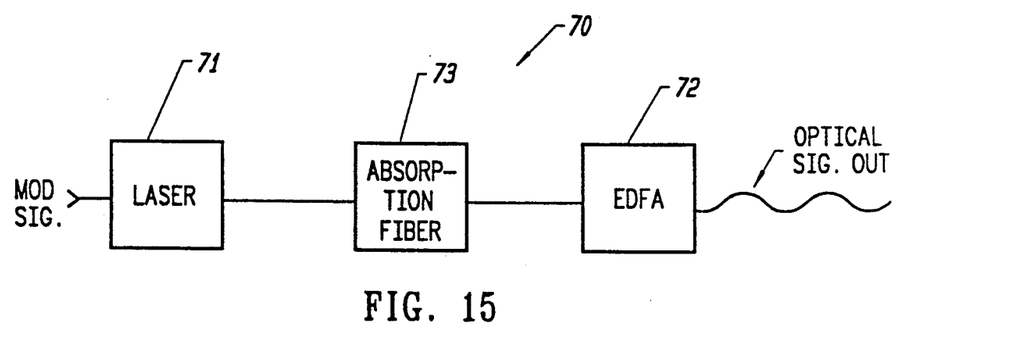
FIG. 15 is a block diagram of an optical transmission system comprising an optical compensation circuit according to the present invention.

Referring to FIG. 15, there is shown a simplified block diagram of an optical signal transmission system designated generally as 70 comprising a laser 71 and an optical signal amplifier comprising an erbium-doped fiber amplifier (EDFA) 72. Coupled between the optical signal output of the laser 71 and the optical input of the EDFA 72 there is provided an optical compensation circuit 73 comprising an erbium-doped absorption fiber according to the present invention.

Figure 16:
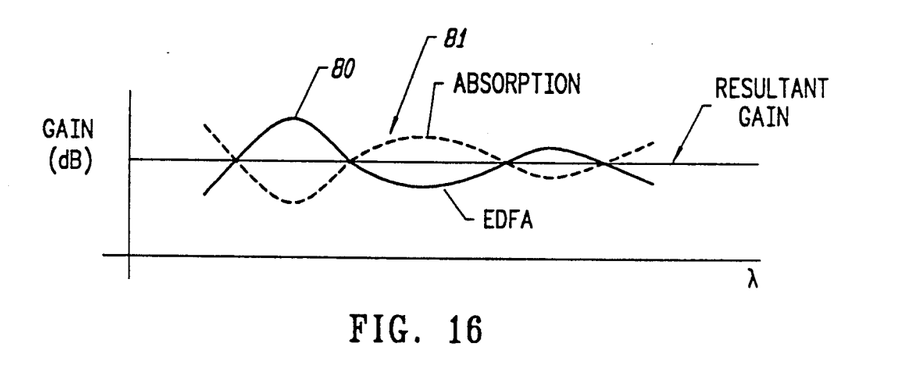
FIG. 16 is a diagram showing superimposed gain and absorption profiles of an erbium-doped fiber amplifier (EDFA) and an optical compensation circuit according to the present invention.

Referring to FIG. 16, there is shown a solid curve 80 representing the gain profile as a function of wavelength λ of a typical EDFA and a broken line curve 81 which represents the absorption profile of an optical compensation circuit which would be required to linearize the output of the EDFA.

Figure 17:
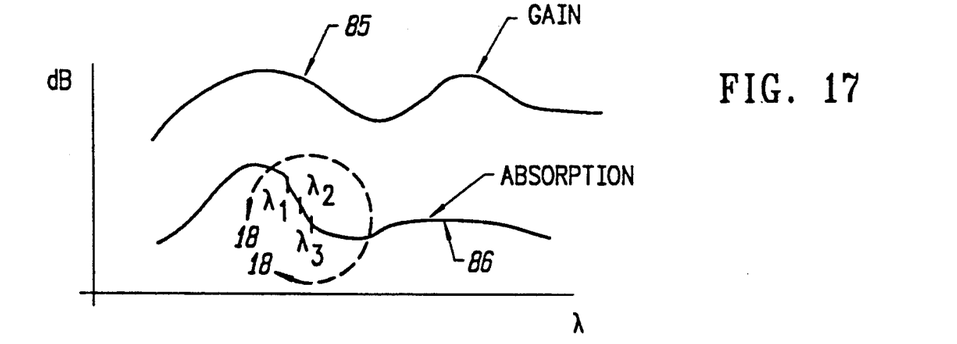
FIG. 17 is a diagram representing gain and absorption profiles of a typical erbium-doped fiber.

Referring to FIG. 17, there is illustrated a gain profile shown by a curve 85 for an optically pumped erbium-doped fiber amplifier and a curve 86 representing an absorption profile for a predetermined length of non-optically pumped erbium-doped fiber. The absorption profile of the erbium-doped fiber is a function of the length of the fiber, as will be further described below, and can be chosen to compensate for both expansion-type and compression-type gain distortion in the EDFA.

Figure 18:
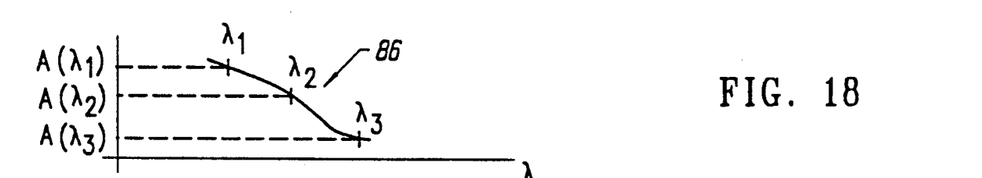
FIG. 18 is a diagram of an expanded portion of the absorption curve within the arrows 18—18 of FIG. 19.

Referring to FIG. 18, there is shown an enlarged segment of the curve 86 of FIG. 17 showing a section of the curve 86 which represents a negative going absorption profile as a function of wavelength λ wherein at three successive wavelengths $\lambda_1, \lambda_2, \lambda_3$, the absorption of the fiber decreases with increasing wavelength.

Figure 19:
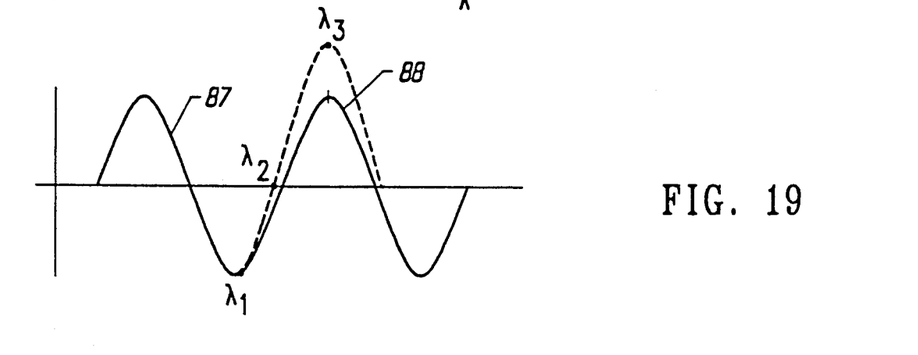
FIG. 19 is a diagram representing an expansion-type distortion resulting from the non-linear dependency of absorption on wavelength.

Referring to FIG. 19, there is shown a solid curve 87 and a broken curve 88. The solid curve 87 represents a non-distorted gain profile for an optically pumped erbium-doped fiber amplifier. The broken line 88 represents an expansion-type gain distortion due to a nonlinear dependency of absorption on wavelength. As can be seen in FIG. 19, the magnitude of the distortion increases with increasing wavelength as represented by the wavelengths $\lambda_1, \lambda_2, \lambda_3$.

Figure 20:
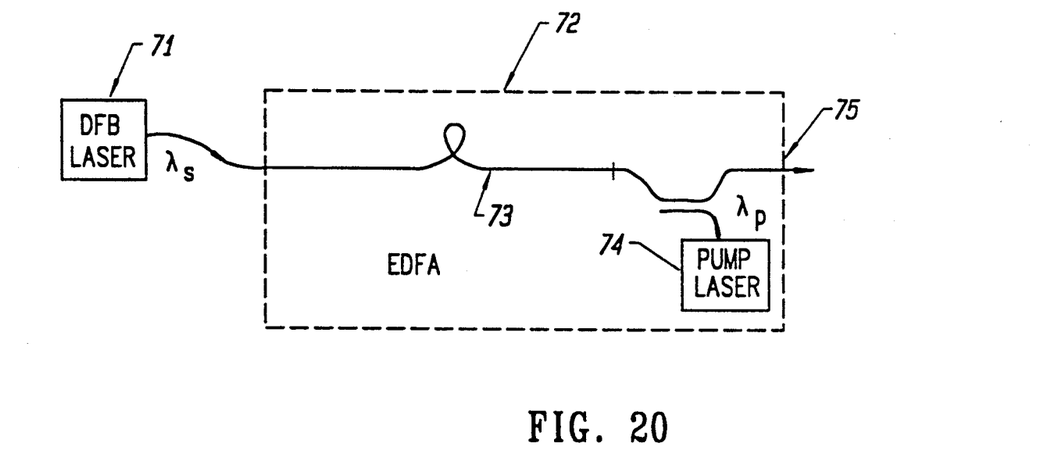
FIG. 20 is a block diagram of a gain block/optical amplifier block comprising an EDFA.

Referring to FIG. 20, there is provided a more detailed diagram of the laser 71 and the EDFA 72 of the optical signal transmission system of FIG. 15. As shown in FIG. 20, the laser 71 typically comprises a distributed feedback laser for providing an optical output signal having a wavelength $\lambda_S$. The EDFA comprises an erbium-doped fiber 73 which is coupled to a pump laser 74. The pump laser 74 outputs an optical signal having a wavelength $\lambda_p$ which interacts with the optical signal from the laser 71 for providing an amplified optical output signal at an optical port 75. The slope of the gain profile of the EDFA changes as a function of the pump laser intensity.

In accordance with the present invention, it has been discovered that a predetermined quantity or length of the same erbium-doped fiber used in the EDFA can be used for providing optical compensation of the gain profile of the EDFA. Specifically, the length of this fiber, which is called an absorption fiber to distinguish it from the amplifying fiber in the EDFA, is chosen to provide an absorption profile as a function of wavelength of the laser which is equal in magnitude and opposite in phase to the variation in the mean gain profile of the EDFA and is inserted between the laser and the EDFA as shown in FIG. 15.

In practice, the preferred length of the absorption fiber in meters is determined by first measuring the gain profile of the uncompensated laser and EDFA apparatus as a function of the wavelength of the laser and thereafter calculating the guotient of the mean variation of EDFA gain in decibels (dB) and the coefficient of absorption of the erbium-doped absorption fiber at a predetermined operating wavelength in dB. For example, if the mean gain variation, i.e. the variation of EDFA gain from a mean value is 3 dB at a predetermined nominal operating wavelength and the coefficient of absorption of the erbium-doped absorption fiber at that wavelength is 5 dB/meter, the proferred length of the absorption fiber is 0.6 meters. Thus, to provide the necessary compensation for an EDFA having a mean gain variation of 3 dB, approximately 0.6 meters of erbium-doped absorption fiber is inserted between the laser 71 and the EDFA 72.

Figure 21:
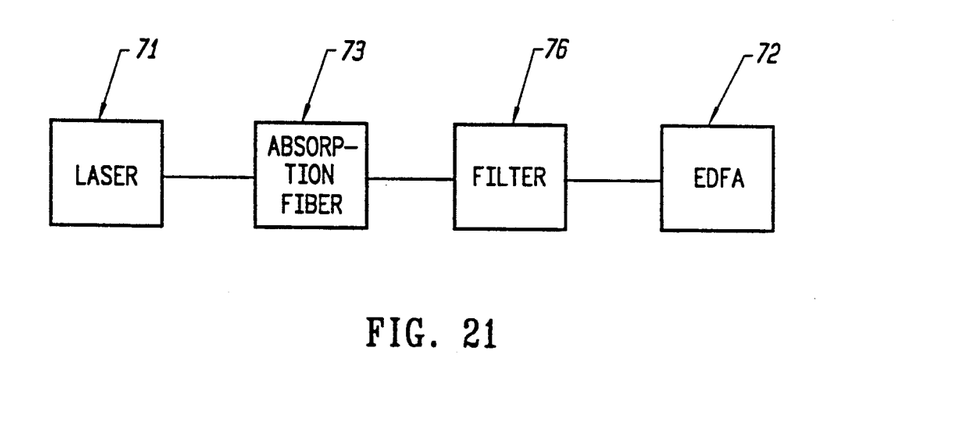
FIG. 21 is a block diagram of another embodiment of the present invention in which an optical filter is coupled between an optical compensation and an EDFA according to the present invention.

In practice, the absorption fiber profile is found to vary as a function of applied signal strength and pump intensity in single pump amplifiers. Thus, depending on the magnitude of these variations, it may be necessary to include a filter between the absorption fiber and the EDFA to block pumping light from the absorption fiber, as illustrated in FIG. 21, wherein a filter 76 is inserted between the absorption fiber 73 and the EDFA 72.

An advantage of the optical compensation circuit of the present invention is that is automatically provides both expansion-type and compression-type compensation as required by the EDFA. That is to say, a section of erbium-doped fiber having a length calculated as described above has an absorption profile which changes as a function of wavelength such that it is equal in magnitude and opposite in phase to either the expansion-type gain distortion or compression-type gain distortion exhibited by an EDFA at a given wavelength. Thus, an advantage of the optical compensation circuit of the present invention is that it automatically provides both expansion-type and compression-type gain compensation as required without any change in the circuit being required.

While preferred embodiments of the present invention are described above, it is contemplated that various modifications may be made thereto without departing from the spirit and scope of the present invention. Accordingly, it is intended that the embodiments described be considered only as illustrations of the present invention and that the scope thereof should not be limited thereto but be determined by reference to the claims hereinafter provided and their equivalents.

What is claimed is:

1. An apparatus for compensating for both expansion-type and compression-type gain distortion products resulting from the interaction of a laser and an erbium-doped fiber optical amplifier (EDFA) comprising:

a predetermined length of erbium-doped absorption fiber having an absorption profile as a function of wavelength which is equal in magnitude and opposite in phase to the variation from the mean gain profile of the EDFA; and means for coupling said predetermined length of said erbium-doped absorption fiber between the optical output of said laser and the optical input of said optical amplifier.

2. An apparatus according to claim 1 wherein said predetermined length of said erbium-doped fiber comprises a length in meters approximately equal to the average variation of EDFA gain in dB from a mean value of said gain divided by the coefficient of absorption in dB/m of the erbium-doped absorption fiber.

3. An apparatus according to claim 1 comprising an optical filter coupled between said absorption fiber and said EDFA.

* * * * *